United States Patent [19]

Seragnoli

[11] 4,125,184

[45] Nov. 14, 1978

[54] SWITCHING DEVICE FOR SWITCHING A CIGARETTE FLOW

[75] Inventor: Enzo Seragnoli, Bologna, Italy

[73] Assignee: G. D. Societa per Azioni, Italy

[21] Appl. No.: 810,418

[22] Filed: Jun. 27, 1977

Related U.S. Application Data

[63] Continuation of Ser. No. 651,346, Jan. 22, 1976, abandoned.

[30] Foreign Application Priority Data

Jan. 29, 1975 [IT] Italy .................................. 3325 A/75

[51] Int. Cl.² ............................................. B65G 47/26
[52] U.S. Cl. .................................... 198/442; 198/367
[58] Field of Search ............... 198/347, 367, 437, 442, 198/598, 599, 601, 636, 637; 131/25; 53/59 R, 148

[56] References Cited

U.S. PATENT DOCUMENTS

| | | | |
|---|---|---|---|
| 1,763,809 | 6/1930 | Murphy | 198/367 |
| 2,819,786 | 1/1958 | Walters | 198/437 |
| 3,767,026 | 10/1973 | Pagdin et al. | 198/442 |
| 3,782,523 | 1/1974 | Giatti | 198/347 |

*Primary Examiner*—Joseph E. Valenza
*Attorney, Agent, or Firm*—Robert E. Burns; Emmanuel J. Lobato; Bruce L. Adams

[57] ABSTRACT

Switching device for switching a flow of cigarettes, transversely aligned with respect to the flow in plants for directly feeding individual cigarettes from and to operating machines. The plant has a compensating device for compensating output unbalances between manufacturing and packeting machines. A conveyor withdraws the cigarettes from the manufacturing machines. The conveyor has a branch leading to the grouping hopper of a packeting machine, and another branch leading to the compensating device. The switching device comprises two arms movably supported at the branching-out zone of the conveyor. The end portions of the arms are shaped so as to define guide surfaces which are parts of corresponding switching paths, and are respectively located on both sides of the cigarette flow.

3 Claims, 4 Drawing Figures

Fig. 1
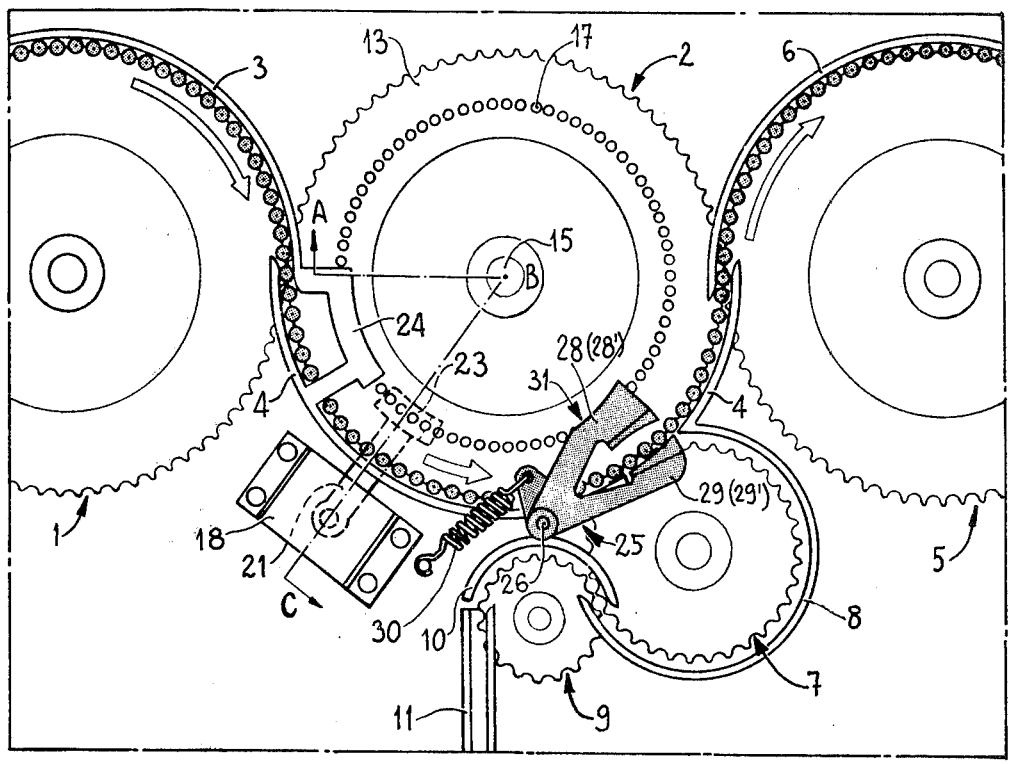
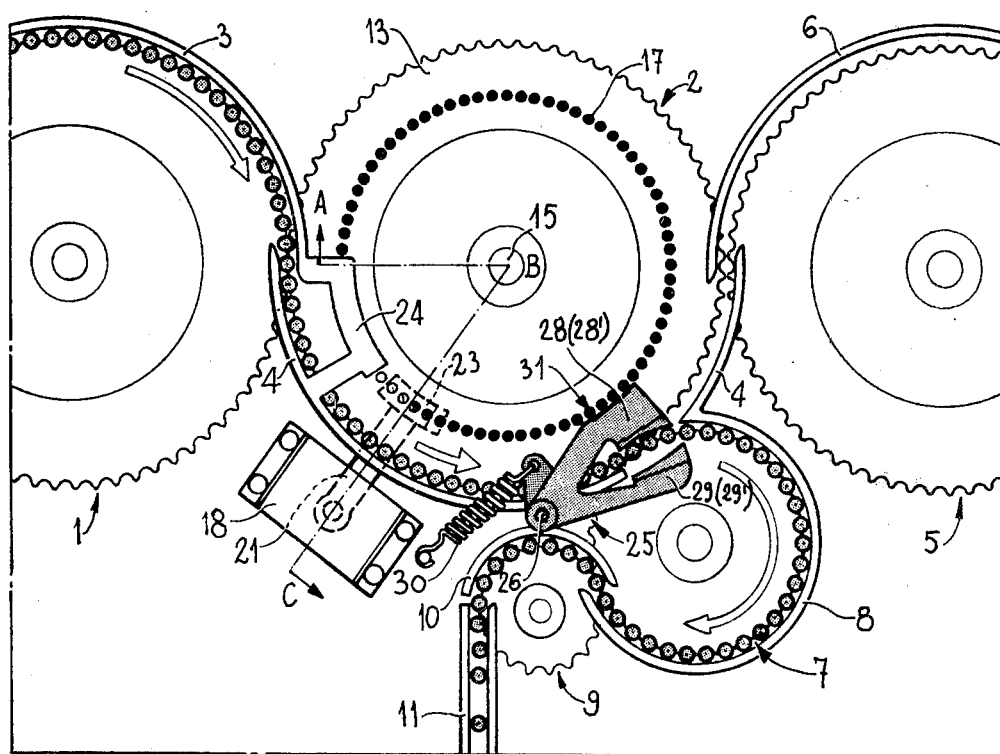
Fig. 2

SWITCHING DEVICE FOR SWITCHING A CIGARETTE FLOW

This is a continuation of application Ser. No. 651,346, now abandoned.

BACKGROUND OF THE INVENTION

The present invention relates to plants for directly feeding cigarettes from manufacturing machines to packeting machine and for compensating unbalances in the outputs of said machines. More particularly, its subject matter is a switching device for switching the flow of cigarettes moving towards the packeting machine in a continuous or uniform succession and arranged transversely with respect to their longitudinal flow.

As known, the path followed by said flow of cigarettes moving towards the packeting machine has a hopper-feeding run on one side which is arranged to directly feed the hopper of the packeting machine, and on the other side it communicates via a different run with a compensating store device of the type described in the Patent Applications Nos. 651,332 and 651,334 of the same Applicant now U.S. Pat. Nos. 4,056,915 and 4,056,916 respectively.

Still as known, in normal operating conditions of the packeting machine, the flow of cigarettes follows the first of said different runs, whereas the cigarettes move along the second run if said packeting machine stops for any reason.

An object of the present invention is thus to provide a cigarette switching device which is arranged to switch the cigarette flow at a branching area along the first run during the normal operation of the packeting machine, or alternatively, along the second run if said machine stops.

Another object of the present invention is to provide a device of the above-mentioned type which is particularly simple in structure, is rapid and reliable in operation and does not damage in any way the cigarettes when it intervenes on them.

SUMMARY OF THE INVENTION

These and still further objects are attained by the cigarette switching device according to the invention for switching the flow of transversely aligned cigarettes in directly feeding plants having a compensating device for compensating output unbalances between the manufacturing and packeting machines. A conveyor which removes or withdraws the cigarettes from the manufacturing machines branches out, thereby leading to the grouping hopper arranged to feed the wrapping line of the packeting machine and also leading to the inlet of said compensating device. The switching device is characterized in that it comprises two pairs of arms movably supported at the branching out zone of said cigarette feeding conveyor, end portions of each pair of arms being shaped so as to define guide surfaces which are a part of the corresponding switching path and are respectively located on both sides of said cigarettes, said arms being moved for the switching of the cigarette flow, by bars moving conjointly with that flow and shifted by control means monitored by aid packeting machine.

BRIEF DESCRIPTION OF THE DRAWINGS:

Further characteristics and advantages of the device according to the invention will better appear from the following detailed description of a preferred embodiment of the device according to the invention, illustrated by way of non-limiting example only in the accompanying drawings, in which:

FIG. 1 is a front view of apparatus according to the present invention operating in a first operating condition;

FIG. 2 is a similar view showing a second operating condition of the apparatus;

Figure 3:
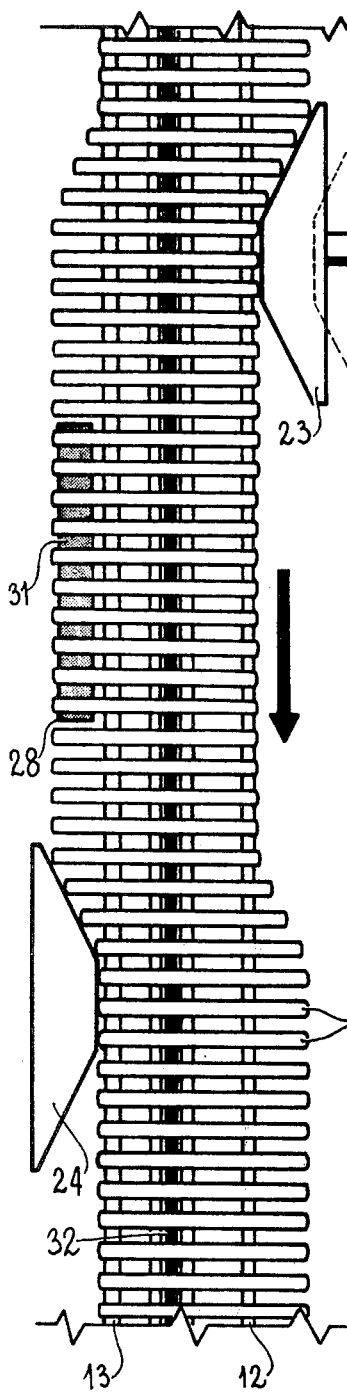
FIG. 3 is a side vidw schematically illustrating a plan development of a cylindrical surface in the apparatus.

DESCRIPTION OF THE PREFERRED EMBODIMENT:

The transfer of cigarettes from each manufacturing machine occurs by disc pairs 1, 2, 5, mounted on horizontal axes parallel to each other and continuously rotating as parts of the conveyor system.

Such rotating is derived from a motion source, not shown in the drawings, by means of gearwheels accompanying each pair of discs.

The discs 12, 13 of each pair have the same diameter and are located on the respective axis 15 at a distance slightly less than the length of a cigarette and are formed with grooves G uniformly distributed all around them to provide seats for cigarettes.

The cigarettes are transported by the discs of each pair. Each cigarette, as shown, is inserted into the seat formed by the grooves in a pair of discs, and is guided, supported and assisted all along its path by guides or covers which are coaxial with each of said pairs of discs.

More particularly (see FIGS. 1 and 2), two pairs of discs having respective covers 3 and 4 are indicated by 1 and 2. The pair 1 rotates in clockwise direction, whereas the pair 2 rotates in counter-clockwise direction, the pairs 1 and 2 defining the cigarette feeding path to which the branching out paths are connected.

The cigarettes, once they have reached the disc pair 2, may follow two alternative paths, one leading to the hopper of the packeting machine in the case of normal operation of the latter and the other leading to a compensating store device if the packeting machine stops.

For this purpose, cigarette switching means 25 according to the present invention are located near the disc pair 2.

A first pair of discs in the connecting line to the hopper of the packeting machine is indicated by 5, is provided with a guide or cover 6, and is arranged to withdraw, by rotating in clockwise direction, any cigarettes arriving on the disc pair 2 at a position diametrically opposite to the zone where the disc pair 2 is fed with cigarettes by the disc pair 1.

A first pair of discs in the line connecting the disc pair 2 to the compensating store device indicated at 7, is provided with a guide or cover 8, and is, through the cigarettes as shown, in contact with the disc pair 2 in a position where the guide 4 is interrupted or apertured or divided into two parts.

The pair of discs 7 is followed by a pair of discs 9 having a guide 10 and finally by an inlet channel 11 arranged to lead the cigarettes to a compensating store device of the type disclosed in the above-mentioned Patent Applications of the Applicant.

Figure 4:
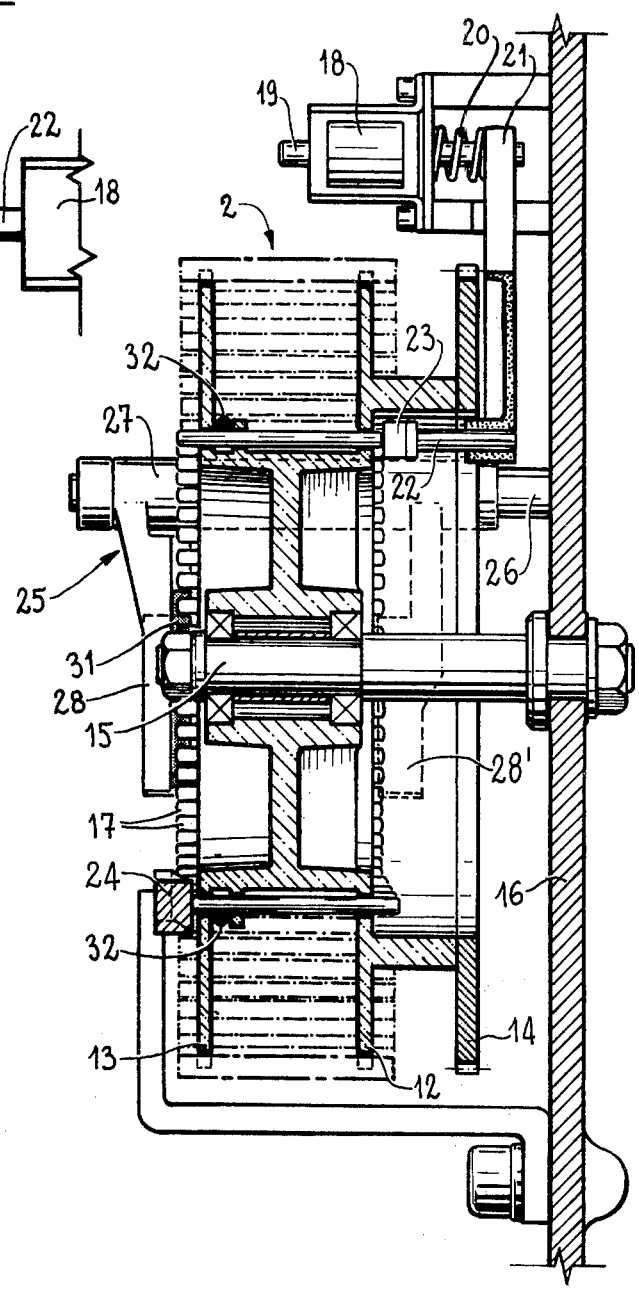
FIG. 4 is a cross-sectional side view, taken along the lines A-B-C of FIGS. 1 and 2 when rotated 180° in their plane.

With particular reference to FIGS. 3 and 4, the pair of discs 2 at which the switching device according to the invention operates, comprises the two discs 12 and 13 which are idly mounted, together with a gearwheel 14 by means of which it is rotated in counter-clockwise direction, on a shaft 15 supported by a vertical plate 16.

The pair of discs 2 carries a cylindrical series of bars 17 parallel to the shaft 15 and slidable along bores distributed over a circle coaxial with the discs 12 and 13, the bars 17 being spring-loaded by a resilient ring 32 surrounding them, to hold them frictionally in their bores.

The bars 17 as shown as equal in number to seats G formed in said pair of discs 2, are radially aligned with respect to each seat. They are longitudinally dimensioned so as to project to a suitable extent from the face of either disc 12 or 13, as will be described, for operating the switching element 25.

A power means, shown as an electromagnet 18, is mounted on a bracket as shown rigid with the plate 16 and its keeper is parallel to the axis 15. A rod 21 has a first end mounted on the keeper and biased away from the electromagnet by a spring 20, the rod 21 radially extending with respect to the pair 2, see FIGS. 1 and 2, into the zone defined between the plate 16 and the gear 14.

A rod 22 normal to the disc 12 is fixed to the second end of rod 21 and is arranged at the same distance as that of the bars 17 with respect to the shaft or axis 15. On the free end of the rod 22 there is mounted a block 23 which has a substantially trapezoidal cross-section (see FIG. 3) with respect to a plane tangential with the cylindrical series of bars 17.

Owning to the above-described connection, block 23 may take two different positions with respect to the disc 12 at a zone defined between the feeding position of the cigarettes to the pair of discs 2 and the contact position of the disc pair 2 with the disc pair 7.

More precisely, while the electromagnet 18 is in a deenergized condition, owing to the action of the spring 20, the block 23 is in the position shown by a dashed line in FIG. 3, i.e., it is remote from the trajectory of the bars 17 projecting from the disc 12, this position being called resting position hereinafter.

When the electromagnet 18 is in an energized condition, the block 23 moves instead to the position shown by a full line in said FIG. 3, so that upon rotation of the pair of discs 2, the bars 17 are caused to progressively axially slide from the right hand leftwards (see FIGS. 3 and 4) and thus downstream of the range of action of the block 23 they project from the face of the disc 13 in a position which is called operating position hereinafter.

Immediately upstream of the range of action of the block 23, but on the side of the disc 13 and adjacent thereto, a block 24 is fixed to end portions of the guides 3 and 4, the block 24 also having a trapezoidal cross-section with respect to a plane tangential with the cylindrical series defined above.

Such block 24 meets the bars 17 projecting from the disc 13, which have previously undergone the action of the block 23, and moves them back, causing them to slide axially to their initial resting position.

At a contact zone between the disc pairs 2 and 7 and where the guide 4 is interrupted or apertured, between two parts of the guide as shown, downstream of the zone where the block 23 acts, a cigarette switching element 25 is located, the switching element being mobile about a shaft 26 parallel to the shaft 15 and rigid with the plate 16.

Such element 25 comprises a tubular sleeve 27 mounted on the shaft 26 and two upper arms 28 and 28', rigidly mounted thereon as shown, close to the outer faces of the discs 13 and 12, respectively, and two lower arms 29 and 29' close to the outer faces of the pair of discs 7.

One end of a tension spring 30 is fixed to the upper arm 28 or 28', whereas the other end thereof is connected to means rigid with said plate 16.

The same arm 28 also has at its upper end an arcuate border or rim or surface 31 which has the same radius as that of the cylindrical series of bars 17, this arcuate surface beng concave toward the center of the disc 13 and being in contact with the outside of the cylindrical series of rods 17, in one position of element 25 as shown in FIG. 2, or being disposed across the withdrawn series of rods 17 in the other position, shown in FIG. 1.

The switching element 25 can take these two positions by being rotated about its axis 26. It takes its upper position (FIG. 1) owing to the action of the draw-spring 30 where arcuately shaped ends of the two lower arms 29 and 29', concave toward the center of disc 13, locate themselves in such a way as to interconnect the two parts of the interrupted or apertured guide 4 at said contact zone, such interconnecting ends being tangential with the ends of cigarettes resting in the seats of discs 12,13 and projecting from the faces of the discs.

The lower position is reached when the bars 17 are in their operating position due to the action of the block 23. The bars 17 then engage the arcuate border or edge 31, turning the switching element 25 so as to overcome the resistance of the spring 30.

In the second case, arcuately shaped ends of the two upper arms 28 and 28', concave toward the center of discs 7 as shown, are located in such a way as to become connecting elements in and for the flow-branching or switching zone.

Having described the various members forming the device according to the invention and the respective mechanical actuating means, we shall now examine the behaviour of such a device in connection with the various operating modes of the plant of which it is a part or, in other words, in connection with the fact that the packeting machine operates in normal operating conditions or, alternatively, in dwelling conditions for any reason whatsoever.

In the first case (see FIG. 1), the cigarette flow through the succession of conveying disc pairs 1 and 2 is directly sent to the hopper of the packeting machine, without the compensating store device intervening, via the disc pair 5, by switching element 25.

The electromagnet 18 is in a de-energized condition and the rods 17 are not engaged by the block 23 and remain in their rest position while projecting from the disc 12, so as not to interfere with the arcuate rim or edge 31 of the switch element 25 which is thus maintained in its upper position.

Accordingly, as already mentioned above, the ends of the upper arms 29 and 29' locate themselves so as to become a connecting element between the upstream portion and the downstream portion of the guide 4 at the switching zone, thereby guiding the cigarette flow from the feeding zone to the pair of discs 5.

In the case of a stoppage of the packeting machine and of normal operation of the manufacturing machine assocated with the compensating store device fed by the channel 11, as soon as the cigarettes inside the hopper of said packeting machine have reached a predetermined maximum level, a control signal is applied to the electromagnet 18, for example, by means of a photocell device, not shown.

While said electromagnet 18 is an energized condition, the bars 17 at the switching zone of the block 23 take their operating position, thereby engaging at a somewhat downstream position the arcuate edge or border 31 of the arm 28 of the switching element 25.

In view of the above, the guide 4 upstream of the contact zone is then connected by means of the ends of the upper arms 28 and 28' to the guide 8 of the pair of discs 7, whereby the row of cigarettes is switched to the pair of disc 7 and, via disks 9, to the channel 11 and towards said compensating store device.

In a return movement, the rods 17 upon rotation of the pair of discs 2 at the action zone of the block 23, take their rest position again owing to the action of the fixed block 24.

When the packeting machine starts working again, deenergizing control signal is applied to the electromagnet 18 and the block 23 returns to its previous position outside the trajectory of the rods 17.

As soon as the last rod 17 in its operating position leaves the arcuate edge or border 31, the switching element 25 moves to the position shown in FIG. 1 owing to the action of the drawspring 30, thereby feeding the cigarettes to the pair of discs 5.

It should be noted that according to an important characteristic of the present invention and in conformity with what was already mentioned in the objects and can be deduced from the description given with reference to the accompanying drawings, the switching of the cigarette flow from the pair of discs 5 to the pair of discs 7 and vice versa occurs without any possibility of damaging the cigarettes.

For this reason, the switching element 25 is suitably shaped and dimensioned and its operation is suitably timed with respect to the conveying speed of the cigarette flow.

I claim:

1. A device for rapidly switching a continuous flow of newly manufactured cigarettes, comprising:

a first cigarette conveying wheel continuously rapidly rotated in one direction and having a first circumferential portion constituting a part of one path of a flow of cigarettes, disposed transversely of the path;

a second cigarette conveying wheel, tangential to said first wheel, continuously rapidly rotated in an opposite direction and having a second circumferential portion constituting a part of another path for the flow with cigarettes disposed transversely of the other path, the two circumferential portions defining a switching zone therebetween;

a unitary bifurcated switching member disposed between the wheels and rapidly movable in the switching zone about a single axis transverse to said paths and parallel to the cigarettes, said switching member having two rigidly interconnected arms, an upper one and a lower one, on one side of said cigarette conveying wheels and, rigidly connected with said arms, two additional rigidly interconnected arms, an upper one and a lower one, on the other side of said cigarette conveying wheels, the upper arms defining a guide surface facing and shaped to surround said second circumferential portion, and the lower arms defining a guide surface facing and shaped to surround said first circumferential portion; and drive means for the rapid moving of said unitary bifurcated switching member to alternately position the guide surfaces of the arms thereof adjacent said first and second circumferential portions of the cigarette conveying wheels for thereby effecting rapid switching of the flow alternately to said one and other path while the rapid rotation of the cigarette conveying wheels continues.

2. A device for rapidly switching to one or another path a continuous flow of newly manufactured cigarettes, comprising:

a first cigarette conveying wheel continuously rapidly rotated in one direction and have a first circumferential portion constituting a part of one path of a flow of cigarettes disposed transversely of the path;

a second cigarette conveying wheel, tangential to said first cigarette conveying wheel, continuously rapidly rotated in an opposite direction and having a second circumferential portion constituting a part of another path for the flow of cigarettes disposed transversely of the other path, the two circumferential portions defining a switching zone therebetween;

a bifurcated switching member disposed between the wheels and rapidly movable in the switching zone about an axis transverse to said paths and parallel to the cigarettes, said switching member having two upper arms, one on each side of said cigarette conveying wheels, and two lower arms, one on each side of said cigarette conveying wheels, the lower arms defining a guide surface facing and shaped to surround said first circumferential portion and the upper arms defining a guide surface facing and shaped to surround said second circumferential portion; and drive means for the rapid moving of said bifurcated switching member to alternately position the guide surfaces of the arms thereof adjacent said first and second circumferential portions of the cigarette conveying wheels, the drive means comprising a series of rods parallel to the cigarettes and circumferentially arranged in said first cigarette conveying wheel in a circle concentric with said first circumferential portion, said rods being axially slidable and in radial alignment with the cigarettes along the path of the cigarettes at said first cigarette conveying wheel; a driving surface on the upper arms, said driving surface being positioned on the upper arms on the side opposite to the guide surface thereof, said driving surface facing and shaped to surround a part of said circle of said circumferentially arranged rods; control means controlled by a cigarette packeting machine for axially moving said rods from an inoperative position in which said rods do not contact said driving surface to an operative position in which said rods contact said driving surface to move the switching member for the alternate positioning of the guide surfaces of the upper arms adjacent said second circumferential portion of the second cigarette conveying wheel; a stationary control means located upstream of the switching zone, relative to the rotational direction of said first cigarette conveying wheel, to axially move said rods from said operative position to said inoperative position; and resilient means for moving said switching member for the alternate positioning of the guide surfaces of the arms to place the guide surface of the lower amrs adjacent said first circumferential portion of the first cigarette conveying wheel, when said rods are in the inoperative position.

3. A device for rapidly switching to one or another path a continuous flow of newly manufactured cigarettes, comprising:
- a first cigarette conveying wheel continuously rapidly rotated in one direction and having a first circumferential portion constituting a part of one path of a flow of cigarettes disposed transversely of the path;
- a second cigarette conveying wheel, tangential to said first cigarette conveying wheel, continuously rapidly rotated in an opposite direction and having a second circumferential portion constituting a part of another path for the flow of cigarettes disposed transversely of the other path, the two circumferential portions defining a switching zone therebetween;
- a bifurcated switching member disposed between the wheels and rapidly movable in the switching zone about an axis transverse to said paths and parallel to the cigarettes, said switching member having a first pair of arms on one side of said cigarette conveying wheels and a second pair of arms on the other side of said cigarettes conveying wheels, one arm of each pair defining a guide surface facing and shaped to surround said second circumferential portion, and the other arm of each pair defining a guide surface facing and shaped to surround said first circumferential portion; and
- drive means for the rapid moving of said bifurcated switching member to alternately position the guide surfaces of the arms thereof adjacent said first and second circumferential portions of the cigarettes conveying wheels, for thereby effecting rapid switching of the flow alternately to said one and other path while the rapid rotation of the cigarette conveying wheels continues.

* * * * *